United States Patent [19]

Flannagan et al.

[11] Patent Number: 4,791,399

[45] Date of Patent: Dec. 13, 1988

[54] VEHICLE STOP LAMP SYSTEM

[75] Inventors: Michael J. Flannagan; Michael Sivak, both of Ann Arbor, Mich.

[73] Assignee: The University of Michigan, Ann Arbor, Mich.

[21] Appl. No.: 869,184

[22] Filed: May 30, 1986

[51] Int. Cl.$^4$ .............................................. B60Q 1/44
[52] U.S. Cl. ........................................ 340/71; 340/84; 340/74; 315/80
[58] Field of Search .................... 340/71, 72, 66, 67, 340/74, 84, 105; 315/307, 77, 80

[56] References Cited

U.S. PATENT DOCUMENTS

| | | | |
|---|---|---|---|
| 3,603,840 | 9/1971 | DuRocher | 340/74 X |
| 3,708,782 | 1/1973 | Mori | 340/71 X |
| 4,127,844 | 11/1978 | Purdy | 340/71 |
| 4,221,978 | 9/1980 | Smith et al. | 307/290 X |
| 4,231,013 | 10/1980 | Freeman et al. | 340/71 X |

*Primary Examiner*—Joseph A. Orsino
*Assistant Examiner*—Brian R. Tumm
*Attorney, Agent, or Firm*—Rohm & Monsanto

[57] ABSTRACT

The amount of time required to produce a luminant output signal at the rear of a vehicle in response to the application of a brake is reduced by preheating the filament of the brake lamp and applying an overvoltage thereto when a brake switch is closed in response to the application of the brake. In accordance with the invention, preheating of the filament is achieved by switching a transistor in series with the filament at a fairly high frequency. The duty cycle of the switching operation can be adjusted to conduct a preheat signal through the lamp which results in little or no radiation of light from the filament. This corresponds to a filament temperature of approximately 2000° K., and an increase in temperature of only approximately 800°0 K., is required to produce a normal steady state rated illumination for the lamp. The rate of rise of temperature, and consequently of light output, is accelerated by applying an over-voltage which may correspond to energy stored in a capacitor during periods of time when the brakes are not applied, and subsequently discharged into the brake lamp upon application of the brakes. Flyback or buck-boost circuitry may be used to provide the low level preheat, normal level, and overvoltage modes of operation.

17 Claims, 4 Drawing Sheets

VEHICLE STOP LAMP SYSTEM

BACKGROUND OF THE INVENTION

This invention relates generally to illuminated indicator systems, and more particularly, to vehicle brake light systems.

All motor vehicles used on public roads are required to have an illuminated brake light system mounted on the rear for indicating to a following driver that brakes have been applied. Ordinarily, electrical energy from a vehicle's electrical supply system is conducted to the brake lights upon closing of a brake switch which is coupled to a brake actuator. An operator of a vehicle, upon actuation of the brake system, simultaneously closes the brake switch which closes an electrical circuit between the vehicle electrical supply and the brake light in the rear. The resulting illumination therefore warns the following driver of impending deceleration. The brake switch may be actuated mechanically or in response to hydraulic forces in a modern brake system.

A variety of studies have been conducted of human responses to indicator lamps. It is now generally accepted that the time that it takes a following driver to respond to a signal is an important factor in traffic safety. In fact, reducing the time period of response, even by a fraction of a second, would result in a significant reduction in the number and severity of rear-end collisions. It is to be noted in this regard that at a vehicle speed of 55 miles per hour (mph), the vehicle is traveling at 80.67 feet per second. It is also to be noted that the filament of an incandescent brake bulb takes approximately 250 milliseconds to reach 90% of its steady-state luminous intensity after the application of 12.8 Volts, which is approximately the voltage of a typical vehicle electrical supply. Thus, a vehicle would travel over 20 feet just in the time required for the brake lamp to reach 90% of its final intensity after application of the brakes.

In addition to the foregoing, it is important to note that significant reductions in the damages which result from vehicle collisions can be achieved for even small increases in the time during which the brakes are applied prior to collision. This results from two important facts. First, the reduction in velocity of a vehicle during braking is proportional to the duration of application of the brakes. Second, the energy of collision is essentially proportional to the square of the relative velocity of the vehicles. Thus, any decrease in the velocity of a collision results in a nonlinear decrease in the energy of the collision. These two characteristics, particularly when combined with one another, result in significant advantages being achieved for only small increases of the duration of the application of the brakes.

Furthermore, stimuli which involves abrupt changes, such as flashing beacons on emergency vehicles, have been used to attract attention more strongly than slowly changing stimuli. This benefit would be especially pronounced in situations in which the perceptual and cognitive loads on a following driver are high, thus placing a premium on drawing his or her attention to high-priority signals.

It is, therefore, an object of this invention to provide a simple and economical system for providing earlier warning to a following driver of a brake application.

It is another object of this invention to provide a luminant indication which increases rapidly with time.

It is also an object of this invention to provide a brake light system having a high luminant output.

It is an additional object of this invention to provide a brake light system which achieves an early indication to a following driver without drawing high energy from the vehicle's electrical supply.

It is a further object of this invention to provide a brake light system which increases lamp life.

It is additionally an object of this invention to provide a brake light system which is more salient than conventional systems.

It is yet another object of this invention to provide a brake lamp system which provides early warning without excessive current draw while using conventional incandescent lamps.

SUMMARY OF THE INVENTION

The foregoing and other objects are achieved by this invention which provides a vehicle stop lamp system which utilizes an incandescent lamp. The lamp is characterized as producing an output luminance having a luminance magnitude which is responsive to the application of a lamp input electrical signal having a magnitude parameter which is greater than a predetermined threshold signal level. The lamp has a predetermined luminance magnitude characteristic which is responsive to a magnitude parameter of the lamp input electrical signal. In certain embodiments of the invention, the predetermined threshold signal level is such that the filament of the lamp emits little or no light. In accordance with the invention, the system includes a brake switch which has first and second states selected in response to the application of a braking force to the vehicle. The brake switch controls the lamp input electrical signal. In addition, the invention is provided with signal control circuitry responsive to the brake switch means for applying a low level input electrical signal when the brake switch is in the first state, and a higher level lamp input electrical signal when the brake switch is in the second state.

In accordance with the invention, the signal control circuitry is provided with circuitry for generating the low level signal which is conducted to the lamp. This low level signal operates to preheat the filament of the lamp. In a typical prior art situation, a voltage is applied to the filament of a lamp at room temperature, which is approximately 300° K. This results in the conduction of a transient high current, which current diminishes with filament temperature. At normal operating temperature of the tungsten filament, approximately 2800° K., the resistance is approximately 15 times the cold resistance, resulting in a proportionately smaller steady-state current. It is therefore seen that in a very short period of time, illustratively 250 msec, the tungsten filament must be heated from 300° to 2800° K. In accordance with the invention, however, the filament is preheated to a temperature of approximately 2000° K. Such preheating will not only reduce an initial surge current because the resistance of the filament at 2000° K. is approximately 10 times the cold resistance, but also will reduce the time required to raise the temperature to the normal operating temperature.

In accordance with the invention, the temperature to which the filament is preheated is selected to be just below the temperature threshold at which the lamp begins to radiate significant amounts of visible energy. It is preferable that the brake lights of a motor vehicle not appear to be constantly on, even at a low level, otherwise their value is diminished as a signal. However, the amount of visible radiation which is acceptable is determined partly by the level of surrounding light in which the signal is operated. That level may be fairly high since, during the day, brake lights are viewed in relatively high luminant light, and at night they are seen in close proximity to the presence filament, which is constantly on during normal night driving, and in the glow of the headlights of the following vehicle. These sources of light serve to mask the existence of light coming from the preheated brake lamp filament.

In one illustrative embodiment of the invention where an automobile brake lamp of the type which is rated for operation at 12.8 Volts is preheated, the level of preheating which satisfies the foregoing conditions is roughly equivalent to applying 2.0 Volts to the filament. Since this is considerably below the rated voltage for the filament, the effect of constant preheating on the life of the filament is negligible. The life of a tungsten filament which is operated at a voltage other than its rated voltage is approximated as follows:

$$l = l_{rv}[v_r/v]^{13}$$

In this expression, $l$ is the life of the lamp at the voltage actually used, $l_{rv}$ is the life at the rated voltage, $v$ is the voltage actually used, and $v_r$ is the rated voltage. (See: *Illuminating Engineering Society Lighting Handbook* (4th ed.), 1966). Although this expression is intended to be accurate in the range of approximately between 90 and 110% of the rated voltage, it is sufficiently accurate at the voltages discussed herein for the present purposes. Thus, for a rated voltage of 12.8 Volts, and an operating voltage of 2.0 Volts, the life of the lamp would be $3.0 \times 10^{10} \times l_{rv}$. Thus, it can be seen that the contribution of preheating to the overall life of the bulb is negligible even if the amount of time that the vehicle is operated, which is roughly equivalent to the preheating time, is several orders of magnitude greater than the time that the brake signal is actually on. Moreover, the power consumed in preheating the brake filament is only approximately one Watt per bulb. Thus, the significant advantages of this aspect of the invention are available for only a modest additional power requirement.

In accordance with a further aspect of the invention, the braking indicator system of the present invention is provided, in a specific illustrative embodiment, with circuitry for applying an augmented signal for a predetermined period of time after the brake system of the vehicle is actuated. Use of signal augmentation without filament preheating achieves a significant reduction in the time required for the filament to reach its operating temperature. However, since filament resistance is relatively low when the filament is at room temperature, significant surge current problems would result, as well as diminution of lamp life. However, an even greater reduction in luminance rise time is achieved by combining preheating with augmentation of the initial signal applied to the lamp to indicate application of the brakes.

As noted, the rise in temperature of the filament is much faster for the system of the present invention than for the normal constant-voltage method of operating the signal, resulting in a brake light signal with a more abrupt onset, and which therefore is more effective in drawing the attention of following drivers. However, if the voltage is controlled so that the filament temperature never goes above its normal operating temperature, the use of a transient voltage above the rated voltage should not result in any reduction of bulb life. The primary factor which controls filament life is the rate of evaporation of tungsten. This rate is affected by temperature, but not by rate of change in temperature. By suppressing the cold surge current which is usually the precipitating cause of filament failure, the present system may result in a net extension of bulb life.

In one practical embodiment of the invention, signal augmentation is achieved by charging a fairly large capacitor to the vehicle supply voltage during periods of time when the brakes are not applied. Such charging of the capacitor may be achieved via a resistor which has a value selected so that charging of the capacitor can be effected in approximately two or three seconds. Of course, other charging periods can be implemented in the present invention, the time period noted herein being selected in view of it being unlikely that critical brake applications will occur with less than several seconds intervening.

Upon application of the brakes, the brake switch in one embodiment will place the capacitor in series with the vehicle supply as it is applied to the lamp. Thus, in embodiments where the vehicle supply is at 12.8 Volts, the initial voltage applied to the filament is 25.6 Volts, which voltage diminishes rapidly to 12.8 Volts as the capacitor discharges through the filament. Further circuitry, such as a switch, may be provided to prevent the capacitor from discharging through the vehicle electrical system.

In other embodiments of the invention, other energy storage elements, such as inductors, can be used to store energy for delivery to the brake lamp when the vehicle brakes are actuated. For example, an inductor may be incorporated in a "buck-boost" or "flyback" configuration whereby the energy which is stored in the magnetic field of the inductor is delivered to the lamp filament. The inductive circuitry mentioned herein may operate in combination with a switch which periodically opens and closes the electrical path which supplies current to the inductor. Control circuitry which governs the duty cycle of the switch is used to control the average power of the energy transferred to the filament. In a specific illustrative embodiment, three power levels are required: first, a low level for preheating the filament during all periods that the ignition switch is on and the brake is not on; second, a medium level from approximately 50 msec after the brakes are applied until the brakes are released to maintain the filament at its normal luminous intensity level; and third, a high level of approximately 60 Watts in this embodiment for a brief time of approximately 50 msec just after the brakes are applied to bring the filament to incandescence quickly. In a further embodiment, a small capacitor is connected in parallel with the filament to reduce the peak voltage which appears across the switch each time that it is switched off. In a practical embodiment of the invention, the voltage across the transistor would be approximately 90 Volts in embodiments where the resistance of the load is approximately 5 ohms and the inductor has an inductance of approximately 20 μH.

In still other embodiments of the invention, the signal augmentation circuitry may be configured so that the light output of the brake lamp rises to a level which is higher than the nominally rated output for a brief period of time after application of the brakes. This will result in an increase in the rise-time of the light output and an increase in the apparent abruptness of the onset of the brake light. Such a short-term overvoltage condition can be effected simply, such as by increasing the size of the storage capacitor or applying appropriate control signals to a control switch, such as a control transistor. Moreover, such control may be achieved directly in response to the light output of the brake lamp, such as can be done with a feedback photosensor which will control the control switch in a predetermined manner.

BRIEF DESCRIPTION OF THE DRAWING

Comprehension of the invention is facilitated by reading the following detailed description in conjunction with the annexed drawing, in which.

DETAILED DESCRIPTION

Figure 1:
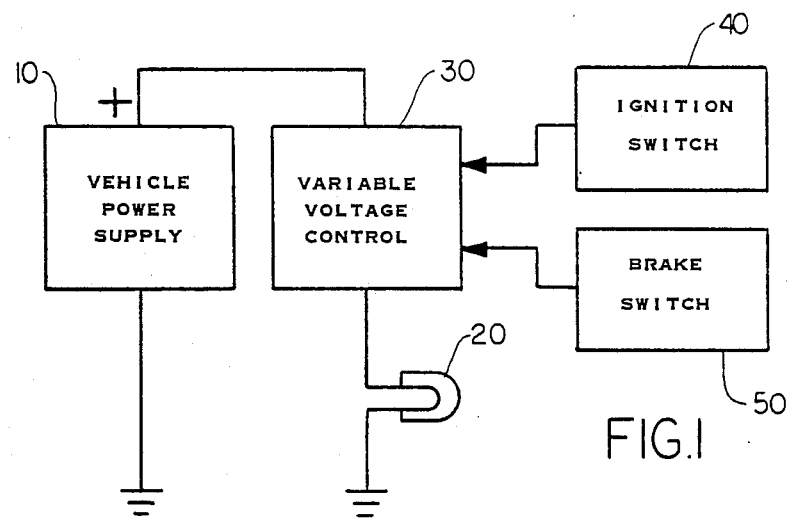
FIG. 1 is a partially schematic and partially block and line representation of an embodiment of the invention.

FIG. 1 is a partially schematic and partially block and line representation of an illustrative embodiment of the invention. As shown in this figure, electrical energy is supplied from a vehicle power supply 10 to an incandescent lamp 20 via a variable voltage control system 30. The variable voltage control system is responsive to an ignition switch 40 and a brake switch 50. Thus, the conduction of electrical energy to lamp 20 is controlled by the variable voltage control system in response to the state of the ignition and brake switches.

Figure 2:
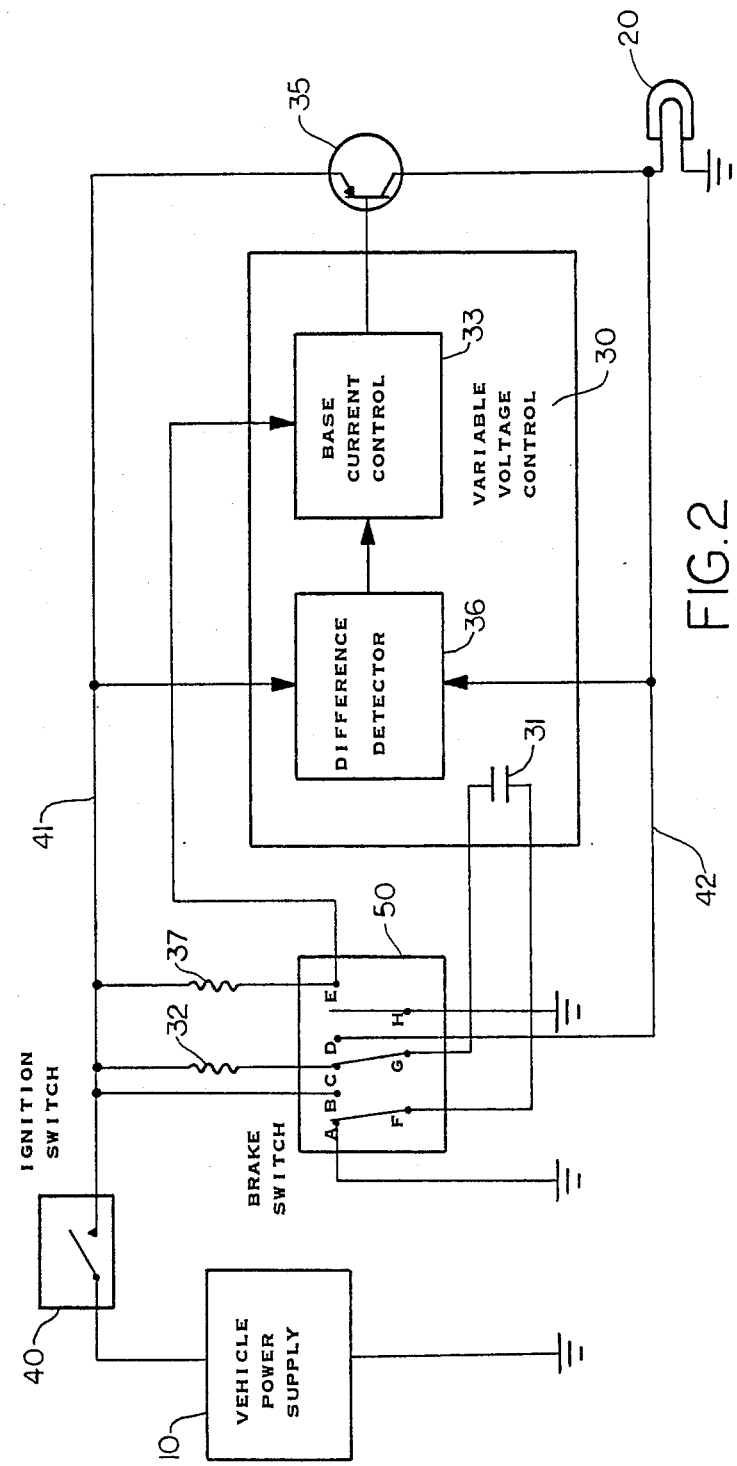
FIG. 2 is a partially schematic and partiall block and line representation of a specific illustrative embodiment of the invention.

FIG. 2 is a partially schematic and partially block and line representation of a specific illustrative embodiment of the invention. For purposes of clarity of the disclosure, elements of structure in this figure which have analogous correspondence to elements of structure in other ones of the figures in this disclosure are identified by the same reference number. In this figure, brake switch 50 is shown to have a plurality of contacts. When the brakes are not being applied, the contacts of the brake switch are in the positions shown in the figure. More specifically, contact F is closed to contact A, contact G is closed to contact C, and contact H is open. While the brake switch is in this position, and assuming that ignition switch 40 is closed, a capacitor 31 is charged via a resistor 32 to a voltage which corresponds to that of vehicle power supply 10. Thus, capacitor 31 charges to approximately 12.8 Volts. The value of resistor 32 is selected so that the capacitor can be fully charged in two to three seconds. During charging, electrical current flows through resistor 32, contacts C and G. and into capacitor 31 which is connected at its other side to a ground reference potential by contacts F and A.

When the brake pedal is applied, the contacts within the brake switch are moved so that contact F is closed to contact B, contact G is closed to contact D, and contact H is closed to contact E. At this time, capacitor 31 is connected in series with lamp 20, so that the lamp has across it 25.6 Volts. Since contact H is at this time closed to contact E, a base current control circuit 33 which governs the conductive state of a transitor switch 35 ensures that transistor switch 35, which is a pnp transistor in this embodiment, is in a nonconductive state. Thus, the energy stored in capacitor 31 is discharged through lamp 20, and the stored energy is not discharged into vehicle power supply 10.

As long as the brake is applied, and capacitor 31 is discharging such that a difference detector circuit 36 senses a higher voltage at line 42 than the voltage of the vehicle power supply at line 41, the difference detector circuit causes the base current control circuit to maintain transistor switch 35 in an open state. However, when the voltage at line 42 is sufficiently close to that of line 41, the difference detector circuit controls the base current circuit so as to maintain transistor switch 35 in a conductive state. Thus, lamp 20 is maintained in a lighted mode upon continuous application of the brake pedal. During times that the ignition switch is closed but the brakes are not applied, base current control circuit 33 is receiving a high signal at terminal E of the brake switch via resistor 37, thereby controlling transistor switch 35 to conduct a low level preheat current to lamp 20.

Figure 3:
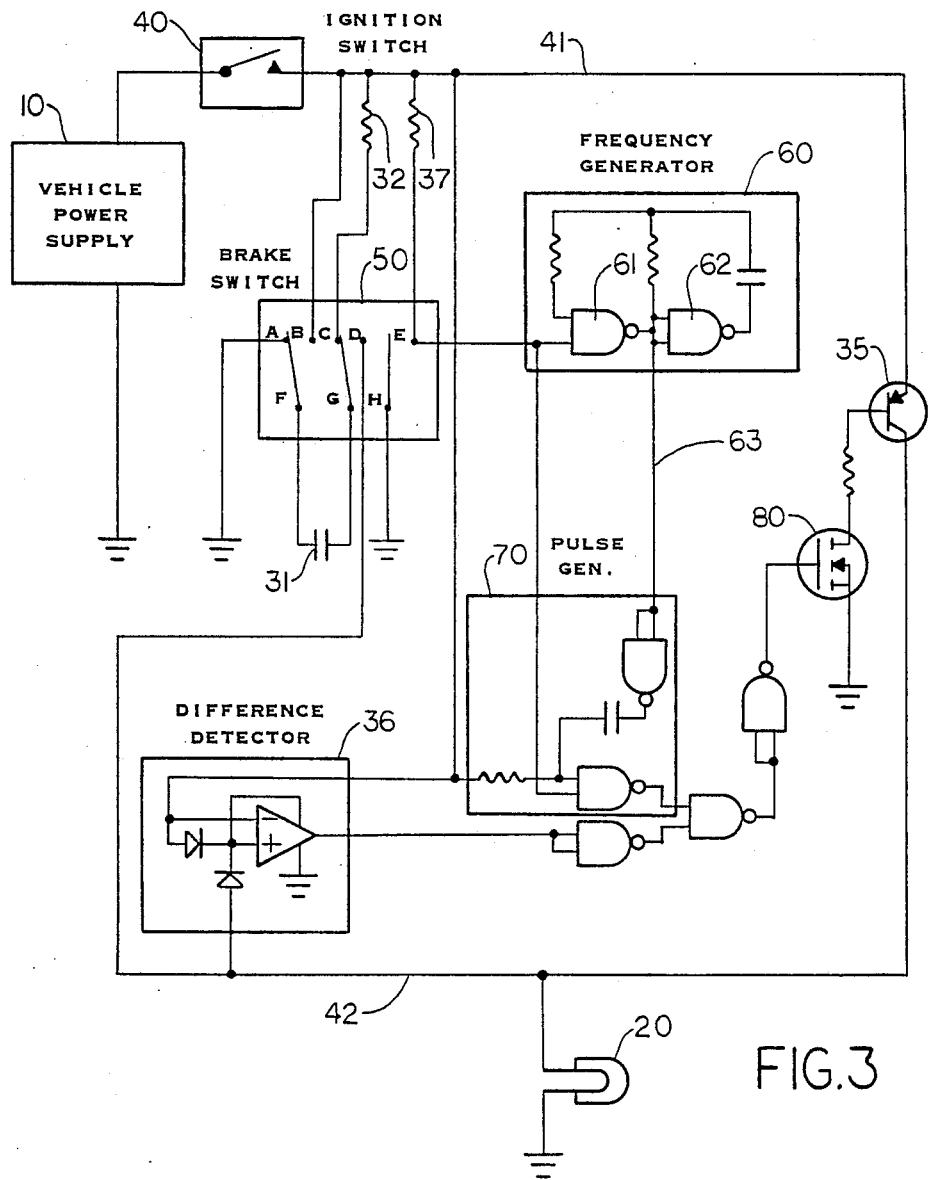
FIG. 3 is a is a schematic representation of specific circuitry of an embodiment of the invention.

FIG. 3 is a partially schematic and partially block and line representation of a specific illustrative embodiment of the present invention. Elements of structure which have analogous correspondence to other elements of structure in other ones of the figures in this disclosure are similarly identified. In this figure, a frequency generator 60 is formed of a pair of NAND logic elements 61 and 62 which are connected to one another in such a manner as to produce at an output 63 thereof a cyclically varying signal. This signal is conducted to a pulse generator 70 which controls the width of an output pulse and therefore the duty cycle of transistor switch 35.

The base current of transistor switch 35 is controlled by a heavy duty transistor 80 which is responsive to the outputs of pulse generator 70 and difference detector circuit 36. Persons of skill in the art can select resistor and capacitor values in frequency generator 60 and pulse generator 70 to provide a square wave control signal to transistor 80. In an embodiment of the invention where the vehicle power supply generates 12.8 Volts, a duty cycle of approximately 3% achieves the equivalent of 2 Volts dc as transistor switch 35 is rapidly alternated between conductive and nonconductive states. Preferably, the frequency of switching of transistor switch 35 should be approximately between 5 and 50 KHz. In the specific illustrative embodiment of FIG. 3, capacitor 31 is probably the costliest component since it is fairly large, on the order of 16,900 mFd. There are, however, some alternatives for supplying overvoltage which may be equally effective and much less costly. These include using a smaller capacitor charged by a higher voltage supply, or a high voltage supply with enough power to drive the filament directly without an additional charge storage component.

Figure 4:
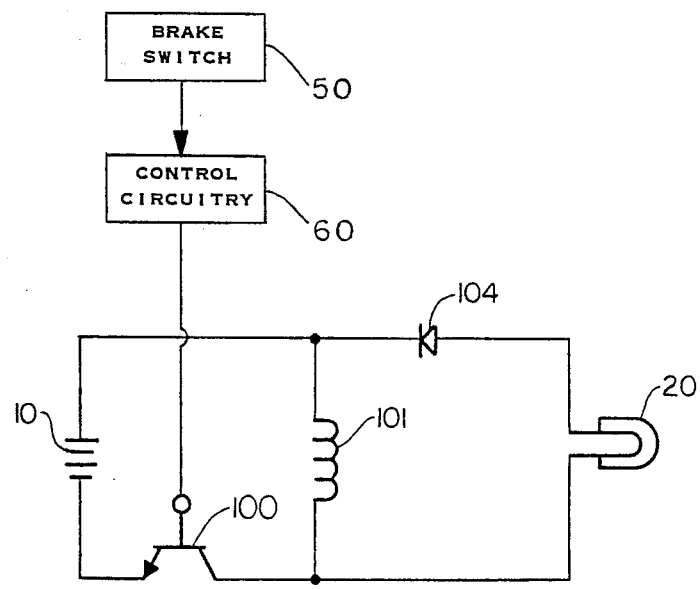
FIG. 4 is a schematic representation of a flyback circuit useful in the practice of a further embodiment of the invention.

FIG. 4 is a schematic representation of a flyback or buckboost circuit of a type which is suitable in the practice of the invention. In FIG. 4, a transistor switch 100 conrols the flow of current through an inductor 101 from a battery, which may be vehicle power supply 10. By operation of control circuitry 60, transistor 100 is closed so that current begins to build through inductor 101. The inductor has an inductance value L such that current builds up at a rate V/L. After t seconds, the current through the inductor is tV/L. Energy is thus transferred from battery 10 to the magnetic field of inductor 101 while the transistor is in the conductive state, a diode 104 is reverse-biased and therefore no current flows therethrough to the load, which is lamp 20. However, when transistor 100 is opened so that current flow therethrough is discontinued, the magnetic field surrounding inductor 101 begins to collapse and the current through the inductor begins to decrease. The decaying current is conducted through lamp 20 and diode 104 as a result of a reversal of the voltage across the inductor. Thus, diode 104 is forward biased, thereby permitting current flow through the lamp. As indicated, the current in this loop decays exponentially as the energy in the magnetic field of inductor 101 is converted to heat in lamp 20. The current, as a function of time t is $I_{MAX}e^{-t/T}$, where $T=L/R$.

In this specific illustrative embodiment, a reasonable value for the inductance L of inductor 101 would 20 $\mu$H, with a maximum current capacity of 20 amps. With a battery voltage of approximately 12 Volts, maximum current would be reached in:

$$t=I_{MAX}L/V=33 \; \mu sec$$

After transistor 100 is turned off, the current through inductor 101 falls exponentially in accordance with the following relationship:

$$I=I_{MAX}e^{-t/T}=(20 \; amps)e^{-t/(20\times10^{-6}/5 \; ohms)}$$

It should be noted that the resistance value is that of the filament, and therefore is a function of temperature. However, for the purposes herein, 5 ohms is a reasonable approximation.

As previously indicated, the circuit described in FIG. 4 is required to produce three different average power levels. These include: (1) a low level for preheating during all periods that the ignition switch is on and the brake is not on; (2) a high level (of approximately 60 Watts) for a brief time (of approximately 50 msec) just after the brakes are applied in order to quickly build the filament to incandescence; (3) a medium level from 50 msec after the brakes are applied until the brakes are released to maintain the filament at its normal luminous intensity level. The two lower power levels can easily by produced by the same circuit by reducing the percentage of time of each on/off cycle that the transistor is on. In essence, the duty cycle of the transistor is controlled. In the practice of the invention, a small capacitor (not shown in this figure) should be connected in parallel with the brake light filament to reduce the peak voltage which appears across the transistor each time that it is switched off.

Figure 5:
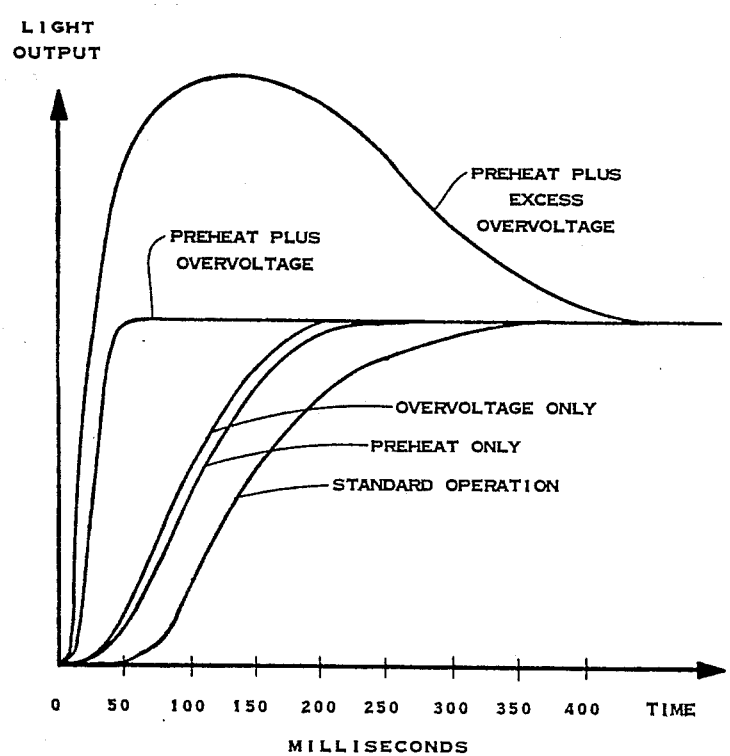
FIG. 5 is a graphical representation of light output with respect to time illustrating the timing relationships between a standard mode, a preheated mode, an overvoltage mode, and combined preheated and overvoltage modes of operation of an incandescent lamp.

FIG. 5 is a graphical representation of a plot of output light versus time for various modes of operation of the stoplamp preheat system. Five curves are shown, one for standard operation of a brake lamp system wherein the supply voltage is applied directly to the lamp upon actuation of the brake system, a second curve showing the effects of filament preheating, a third curve showing the effects of voltage augmentation, a fourth curve showing the result when filament preheating and voltage augmentation are employed together, and a fifth curve which shows the effects of filament preheating and voltage augmentation combined to exceed a nominal rated light output for a predetermined period of time after application of the brakes. It is evident from the fourth and fifth curves that the fastest rise times were produced by preheating the filament in combination with voltage augmentation. In a practical embodiment, preheating in the second and fourth curves is achieved by applying a steady 2 Volt supply to the filament and then applying a constant standard voltage of 12.8 Volts when the brake switch was closed. In the third and fourth curves, voltage augmentation was achieved by applying the initial 25.6 Volts, as described hereinabove, which decayed to 12.8 Volts using a 16,900 mFd capacitor. A 35,000 mFd capacitor was used to achieve the fifth curve. To reach 50% of final luminous intensity, the preheated filament is about 36 msec faster than the standard mode, and the preheated filament with initial overvoltage is about 108 msec faster than the standard. At 90% of final intensity, the corresponding differences are about 30 and 175 msec. At 55 mph, 175 msec corresponds to over 14 feet of travel.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A vehicle stop lamp system comprising:
   lamp means for producing an output luminance having a luminance magnitude responsive to application of a lamp input electrical signal having a magnitude parameter greater than a predetermined threshold signal level, said lamp means having a predetermined luminance magnitude characteristic responsive to said magnitude parameter of said lamp input electrical signal;
   brake switch means having first and second states selected in response to the application of a braking force to the vehicle for controlling said lamp input electrical signal; and
   signal control means responsive to said brake switch means for applying a first lamp input electrical signal having a magnitude parameter which is greater than zero and less than said predetermined threshold signal level when said brake switch means is in said first state, and applying a second lamp input electrical signal having a magnitude parameter which is greater than said predetermined threshold signal level when said brake switch means is in said second state.

2. The vehicle stop lamp system of claim 1 wherein said lamp means is provided with filament means having luminance emission and electrical resistance characteristics responsive to temperature.

3. The vehicle stop lamp system of claim 1 wherein said signal control means comprises:
   first signal production means for producing at an output thereof said first lamp electrical signal; and
   second signal production means for producing at an output thereof said second lamp input electrical signal.

4. The vehicle stop lamp system of claim 3 wherein said first signal production means comprises:

switch means having a control terminal for receiving a control signal, and first and second terminals for defining an interruptable current path therebetween, said first terminal being connected to said lamp means, said second terminal being connected to receive a potential, said current path being interruptable in response to said control signal; and signal generator means coupled to said control terminal of said switch means for producing said control signal.

5. The vehicle stop lamp system of claim 4 wherein said control signal is cyclically varying at a predeterminable frequency, whereby said interruptable current path is responsively cyclically interrupted.

6. The vehicle stop lamp system of claim 5 wherein said first signal production means further comprises pulse generator means coupled to said switch means and said signal generator means for forming pulses.

7. The vehicle stop lamp system of claim 4 wherein there is further provided difference detector means for producing a disablement signal conducted to said switch means whereby said interruptable current path is interrupted when said second signal exceeds a predetermined voltage.

8. The vehicle stop lamp system of claim 4 wherein there is further provided contact means in said brake switch means for applying an enablement signal to said control terminal of said switch means whereby said interruptable path is controlled to be conductive.

9. The vehicle stop lamp system of claim 3 wherein said second signal production means comprises charge accumulator means connected to said brake switch means, whereby an electric charge is accumulated in said charge accumulator means when said brake switch means is in said first state, and said electrical charge is discharged into said lamp means when said brake switch means is in said second state.

10. The vehicle stop lamp system of claim 1 wherein said signal control means comprises:
energy storage means for accumulating energy and releasing said accumulated energy into said lamp means during respective time periods; and
controllable switch means having first and second states, said controllable switch means being coupled to said energy storage means for controlling said accumulating and discharging of said energy in response thereto, whereby said energy storage means accumulates energy when said controllable switch means is in said first state, and discharges said energy when said controllable switch means is in said second state.

11. The vehicle stop lamp system of claim 10 wherein said energy storage means comprises an inductive element whereby said accumulated energy is in the form of a magnetic field.

12. The vehicle stop lamp system of claim 10 wherein said controllable switch means comprises:
solid state switch means having a control terminal; and
switch control means coupled to said control terminal of said solid state switch for providing a control signal thereto, said first and second states being responsive to said control signal.

13. The vehicle stop lamp system of claim 12 wherein said switch control means comprises timing means for establishing a duty cycle of said solid state switch with respect to said first and second states.

14. A luminant indicator system for indicating braking by a vehicle, the luminant indicator system comprising:
brake switch means having first and second switch states corresponding to whether the vehicle is not in a braking mode or in a braking mode, respectively;
lamp means for producing an output luminance having a predetermined output luminance characteristic with respect to a magnitude characteristic of an applied input electrical signal, said luminance characteristic including a corresponding first magnitude level of said magnitude characteristic of said applied input electrical signal at which said output luminance is in a low output luminance range approximately between zero and a predeterminable low output luminance level and a corresponding second magnitude level of said magnitude characteristic of said applied input signal at which said output luminance is at a nominal rated output luminance level which is greater than said low output luminance range; and
signal control means responsive to said brake switch means for controlling said magnitude characteristic of said applied input electrical signal to said first magnitude level when said brake switch means is in said first switch state, and said second magnitude level when said brake switch means is in said second switch state.

15. The luminant indicator system of claim 14 wherein said signal control means is provided with voltage enhancement means for controlling said magnitude characteristic of said applied input electrical signal to a level higher than said second magnitude level for a predetermined time after a moment in time when said brake switch means enters said second switch state.

16. The luminant indicator system of claim 15 wherein said voltage enhancement means comprises energy storage means for accumulating energy when said brake switch means is in said first switch state and releasing said energy when said brake switch means is in said second switch state.

17. A vehicle stop lamp system comprising:
incandescent lamp means for producing an output illumination;
brake switch means responsive to the application of a braking force to said vehicle;
controllable switch means for controlling conduction of an electric signal to said incandescent lamp means;
control means coupled to said controllable switch means for controlling conduction of said electric signal to said incandescent lamp means in response to said brake switch means;
signal augmentation means coupled to said brake switch means for applying an augmented signal to said incandescent lamp means in response to said brake switch means; and
disablement means for disabling said controllable switch means in response to a difference between said augmented signal and a nominal reference potential.

* * * * *